(12) United States Patent
Marinel et al.

(10) Patent No.: US 11,713,280 B2
(45) Date of Patent: Aug. 1, 2023

(54) METHOD FOR THERMAL TREATMENT OF A CERAMIC PART BY MICROWAVES

(71) Applicants: CENTRE NATIONAL DE LA RECHERCHE SCIENTIFIQUE, Paris (FR); UNIVERSITE DE CAEN NORMANDIE, Caen (FR); ECOLE NATIONALE SUPERIEURE D'INGENIEURS CAEN, Caen (FR); UNIVERSITÉ POLYTECHNIQUE HAUTS-DE-FRANCE, Valenciennes (FR); ASSOCIATION POUR LA RECHERCHE ET LE DEVELOPPEMENT DE METHODES ET PROCESSUS INDUSTRIELS-ARMINES, Paris (FR)

(72) Inventors: Sylvain Marinel, Mathieu (FR); Etienne Savary, Caen (FR); François-Xavier Lefevre, Caen (FR); Jérôme Lecourt, Colleville Montgomery (FR); Sébastien Saunier, Firminy (FR); Pauline Chanin-Lambert, Saint Just Saint Rambert (FR)

(73) Assignees: CENTRE NATIONAL DE LA RECHERCHE SCIENTIFIQUE, Paris (FR); UNIVERSITE DE CAEN NORMANDIE, Caen (FR); ECOLE NATIONALE SUPERIEURE D'INGENIEURS CAEN, Caen (FR); UNIVERSITE POLYTECHNIQUE HAUTS-DE-FRANCE, Valenciennes (FR); ASSOCIATION POUR LA RECHERCHE ET LE DEVELOPPEMENT DE METHODES ET PROCESSUS INDUSTRIELS-ARMINES, Paris (FR)

( * ) Notice: Subject to any disclaimer, the term of this patent is extended or adjusted under 35 U.S.C. 154(b) by 1129 days.

(21) Appl. No.: 16/345,664

(22) PCT Filed: Oct. 20, 2017

(86) PCT No.: PCT/EP2017/076818
§ 371 (c)(1),
(2) Date: Apr. 26, 2019

(87) PCT Pub. No.: WO2018/077735
PCT Pub. Date: May 3, 2018

(65) Prior Publication Data
US 2019/0284098 A1    Sep. 19, 2019

(30) Foreign Application Priority Data

Oct. 28, 2016   (FR) ........................................ 1660496

(51) Int. Cl.
*C04B 35/64* (2006.01)
*C04B 35/10* (2006.01)
(Continued)

(52) U.S. Cl.
CPC .............. *C04B 35/64* (2013.01); *C04B 35/10* (2013.01); *C04B 35/48* (2013.01); *H05B 6/6491* (2013.01);
(Continued)

(58) Field of Classification Search
CPC ......... C04B 35/64; C04B 35/10; C04B 35/48; H05B 6/6491; H05B 6/80
See application file for complete search history.

(56) References Cited

U.S. PATENT DOCUMENTS

| 4,307,277 A | 12/1981 | Maeda et al. |
| 2007/0023971 A1 | 2/2007 | Saha et al. |

(Continued)

FOREIGN PATENT DOCUMENTS

| WO | 91/05747 A1 | 5/1991 |
| WO | 2008/077224 A2 | 7/2008 |

OTHER PUBLICATIONS

Heuguet, "Développement des procédés micro-ondes monomodes à 2450 MHz et 915 MHz pour le frittage de céramiques oxydes" [Development of single-mode 2450 MHz and 915 MHz microwave processes for sintering oxide ceramics], Oct. 14, 2014, Université de Caen Basse Normandie).

(Continued)

*Primary Examiner* — James A Fiorito
(74) *Attorney, Agent, or Firm* — BakerHostetler

(57) ABSTRACT

A field of thermal treatment of ceramic materials is provided, and relates to a method for thermal treatment of a solid ceramic part in a microwave cavity, the direction of the electrical field E being substantially uniform in an empty cavity, comprising the steps that consist of placing, in the cavity, at least one ceramic part surrounded by at least one first susceptor with dimensions, material and arrangement configured to emit infrared radiation, each first susceptor including at least one first main surface, each first main surface being an adjusted surface in which the cone distances are parallel to the electrical field E, and of emitting the microwaves into the cavity.

16 Claims, 5 Drawing Sheets

(51) Int. Cl.
*C04B 35/48* (2006.01)
*H05B 6/64* (2006.01)
*H05B 6/80* (2006.01)

(52) U.S. Cl.
CPC ........ *H05B 6/80* (2013.01); *C04B 2235/3217* (2013.01); *C04B 2235/3244* (2013.01); *C04B 2235/656* (2013.01); *C04B 2235/667* (2013.01)

(56) References Cited

U.S. PATENT DOCUMENTS

| 2009/0079101 | A1  | 3/2009  | Laubersheimer et al. |
| 2009/0302031 | A1  | 12/2009 | Mallah |
| 2010/0193574 | A1* | 8/2010  | Cretegny ............... B23K 1/005 228/234.1 |

OTHER PUBLICATIONS

Heuguet, et al., "Effects of the Susceptor Dielectric Properties on the Microwave Sintering of Alumina", vol. 96, Issue 12, Journal of the American Ceramic Society, pp. 3728-3736, Nov. 13, 2013.

Kashimura, et al., "Iron production from Fe3O4 and graphite by applying 915 MHz microwaves", Materials Science & Engineering: A, vol. 556, pp. 977-979, 2012.

Li, et al. "Microwave-induced sintering of Cu-based metallic glass matrix composites in a single-mode 915-MHz applicator", Metallurgical and Materials Transactions A, 42(6), pp. 1463-1467, Jun. 2011.

Li, et al., "Nanocrystallization of Fe73Si7B17Nb3 metallic glass induced by microwave treatment in magnetic field of a single mode 915 MHz applicator", Journal of Alloys and Compounds, vol. 536, pp. 315-318, Sep. 25, 2012.

Zhao, et al., "Hybrid sintering with a tubular susceptor in a cylindrical single-mode microwave furnace", Acta Materialia, vol. 48, No. 14, pp. 3795-3801, Sep. 1, 2000.

* cited by examiner

METHOD FOR THERMAL TREATMENT OF A CERAMIC PART BY MICROWAVES

CROSS-REFERENCE TO RELATED APPLICATIONS

This application is a National Stage of International patent application PCT/EP2017/076818, filed on Oct. 20, 2017, which claims priority to foreign French patent application No. FR 1660496, filed on Oct. 28, 2016, the disclosures of which are incorporated by reference in their entirety.

FIELD OF THE INVENTION

The invention relates to a process for heat treating ceramic materials and more particularly a process for densifying a part made of ceramic material in a microwave cavity.

BACKGROUND

Parts made of ceramic material may be manufactured by heat treatment in order to be consolidated and/or densified. A solid part of powder shaped beforehand, for example by compression or casting, may be densified by heating or sintering. This operation is conventionally carried out by heating a sample of compressed powder with infrared radiation and/or by convection. The infrared-radiation emitting heat source is typically obtained using a resistive element or by combusting a gas. The sample is typically heated to a temperature above 700° C. The efficiency of heat treatments implementing this type of method is not optimal resulting in substantial losses of energy, a higher cost of production and a major environmental impact. In the case of gas ovens, the heating results in the emission of carbon-containing gases that are harmful to the environment.

Microwave ovens are an interesting alternative to these two heat treatment methods. When heating nonmetals, their efficiency is much higher than that of the two methods described above, possibly leading to a significant saving in the amount of energy used versus the case of convection ovens. This efficiency is a result of localized absorption of energy within the sample and of the decrease in total volume to be heated. Microwave ovens also allow the duration of the heat treatment to be decreased relative to conventional methods.

In the prior art, heating of parts made of ceramic material of large dimensions, for example of a size larger than 3 cm, is not or not very compatible with microwave heating. Several reasons may explain this technical problem.

The dielectric properties of many ceramic materials are not favorable to coupling with microwaves at room temperature, this remaining true up to temperatures typically of about 400° C. By way of example, the dielectric losses of zirconia increase significantly above 400° C., leading to a better coupling between zirconia and microwaves above this temperature.

In addition, the thickness able to be heated of a sample (corresponding substantially to the penetration depth into the sample of the microwaves) is dependent both on the properties of the material but also on the frequency $v_0$ of the microwaves: the penetration depth increases as frequency decreases. For certain ceramic materials heated by microwaves, the penetration depth may be smaller than one millimeter, with $v_0$=2.45 GHz (this frequency is the frequency typically used in microwave ovens). The size of a part of ceramic material heated by the energy dissipated by microwaves in said part is in this case limited.

Use of a single-mode cavity allows a sample to be uniformly heat treated in a volume of the cavity: the size of this volume decreases as the frequency of the microwaves introduced into the cavity increases. For example, a typical single-mode cavity into which microwaves at a frequency of 2.45 GHz are emitted allows a sample of a volume typically smaller than 0.35 L to be treated.

One prior-art solution consists in using a lower frequency $v_0$, equal to 915 MHz. S. Li et al. (Li, S., Xie, G., Louzguine-Luzgin, D. V., Sato, M., & Inoue, A. (2011). Microwave-induced sintering of Cu-based metallic glass matrix composites in a single-mode 915-MHz applicator. *Metallurgical and Materials Transactions A*, 42(6), 1463-1467) for example applied this solution to the heat treatment of an amorphous metal alloy i.e. not a ceramic material. The temperature of the heat treatment was 400° C. Using this method, the maximum heat-treatment temperature is limited by the appearance of a plasma and/or electric arc, caused by the strength of the electromagnetic field. Sintering of a ceramic material requires samples to be treated at high temperatures, for example between 1300° C. and 1600° C. It is difficult to reach these temperatures by microwave heating: an electromagnetic field of high-strength is typically required. When the sample or any other part inside a microwave cavity is able to reflect microwaves (even partially) a field strength locally increased by reflection of the microwaves may lead to the appearance of a plasma. The appearance of a plasma has a dramatic effect on the heat treatment of a sample. Plasmas contain free charged particles in their volume and are therefore very conductive: a plasma has the property of reflecting incident electromagnetic fields. This plasma may result in a major disruption of the heating, sufficient to cause a rapid and significant decrease in the temperature of the sample. The appearance of a plasma results in disruption of the spatial distribution of the electromagnetic field in a cavity, and therefore to a nonuniform heat treatment of the one or more treated parts.

Another solution consists in using, in a single-mode 915 MHz oven, two parallel susceptors, the surfaces of which are perpendicular to the electric field present in the cavity (R. Heuguet, "*Développement des procédés micro-ondes mono-modes à 2450 MHz et 915 MHz pour le frittage de ceramiques oxydes*" [Development of single-mode 2450 MHz and 915 MHz microwave processes for sintering oxide ceramics], Thesis presented 14 Oct. 2014, *Université de Caen Basse Normandie*), the two susceptors surrounding the sample to be heat treated. Specifically, since they are perpendicular to the electric field, the susceptors cause the electric field to concentrate in the sample. This allows the required microwave power to be minimized and thus greatly limits the creation of plasma in the vicinity of the sample. This solution allows temperatures of about 1500° C. to be achieved. The present inventors have however noted that, when high microwave powers are required, a plasma is still observed to appear in the vicinity of the susceptors, this adversely affecting the process.

SUMMARY OF THE INVENTION

The invention aims to remedy some or all of the aforementioned drawbacks of the prior art, and more particularly to heat treat, at least partially with microwaves, a ceramic part of a volume larger than 1 cm³, and in the case of a part made of porous ceramic material, to densify it to a degree equivalent to that achieved with a densification carried out with prior-art methods using, for example, convection ovens.

One subject of the invention allowing this aim to be achieved is a process for heat treating at least one solid part made of ceramic material in a microwave cavity, said cavity being formed by a chamber the geometry of which is suitable for resonance in a single mode of an electromagnetic field defining at least one local extremum of the electric or magnetic field in said cavity, at a frequency $v_0$ comprised between 900 MHz and 1 GHz, the direction of the electric field E being substantially uniform in said cavity when it is empty, comprising at least the steps of:

a) placing, in said cavity, at least one said part made of ceramic material suitable for absorbing microwaves at the frequency $v_0$ and at a temperature T higher than or equal to 700° C., at a said local electric- or magnetic-field extremum, said part made of ceramic material being surrounded by at least one first susceptor the dimensions, the material and the arrangement of which are configured so that infrared radiation is emitted directly toward a said solid part during an interaction with the microwaves, each said first susceptor comprising at least one first main surface, each said first main surface being a ruled surface the generatrices of which are parallel to said electric field E in a said cavity when it is empty.

b) emitting said microwaves at the frequency $v_0$ into said cavity.

Advantageously, a said solid part is initially porous and at least one said solid part is densified by heating in step b).

Advantageously, at least two said solid parts are brazed in step b).

Advantageously, at least one element chosen from a ridge and an apex of a least one said first susceptor is rounded.

Advantageously, at least one said first susceptor is made of silicon carbide.

Advantageously, the material of at least one said ceramic part is chosen from alumina and zirconia.

Advantageously, at least one said solid part made of ceramic material is densified so as to comprise at least 90% ceramic material per unit volume.

Advantageously, said process comprises a step consisting in placing the said one or more first susceptors and said one or more parts made of ceramic material in a first thermal confinement.

Advantageously, said first thermal confinement is surrounded by one or more second susceptors.

Advantageously, said arrangement of said one or more second susceptors forms a second volume bounded by said one or more second susceptors and wherein the dimensions, the material and the arrangement of said second susceptors are configured so that infrared radiation is emitted during an interaction with the microwaves.

Advantageously, said one or more second susceptors and said first thermal confinement are arranged in a second thermal confinement.

Advantageously, each said second susceptor comprises at least one second main surface, each said second main surface being a ruled surface the generatrices of which are parallel to said electric field E in a said cavity when it is empty.

Advantageously, at least one element chosen from a ridge and an apex of at least one said second susceptor is rounded.

Advantageously, the material of at least one said susceptors is chosen from a refractory and semiconductor oxide of a transition metal, and a carbide.

Advantageously, the material of said one or more first and second susceptors is chosen from silicon carbide and lanthanum chromite.

Advantageously, said ceramic material comprises a plurality of different ceramic phases and the dimensions, the material and the arrangement of each said first susceptor are configured to selectively heat treat at least one of said phases of each said solid part made of ceramic material.

Advantageously, the maximum size D of said part is chosen so that the ratio between the penetration depth of said microwaves into said part and D is comprised between 0.5 and 10.

BRIEF DESCRIPTION OF THE DRAWINGS

The invention will be better understood and other advantages, details and features thereof will become apparent from the following explanatory description, which is given by way of example with reference to the appended drawings, in which.

The following description presents a plurality of examples of embodiments of the device of the invention: these examples do not limit the scope of the invention. These examples of embodiments have both the essential features of the invention and additional features related to the embodiments in question. For the sake of clarity, elements that are the same have been given the same references in the various figures.

DETAILED DESCRIPTION

Figure 1:
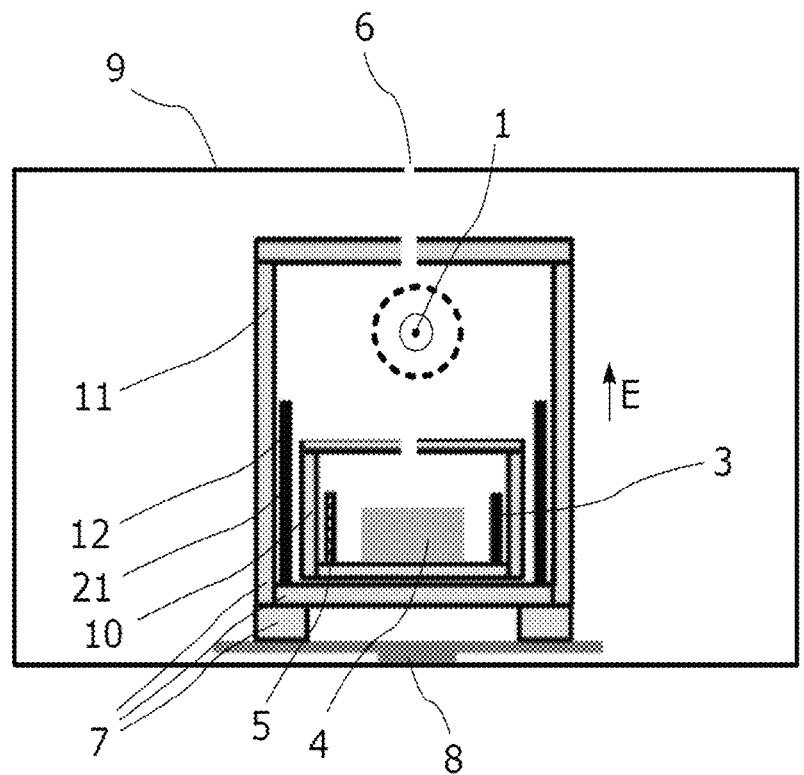
FIG. 1 schematically illustrates the cross section of a device used for implementing the invention.

FIG. 1 schematically illustrates the cross section of a device used to implement the invention.

Generally, the term "microwaves" is understood to mean electromagnetic waves the frequency of which is comprised between 300 MHz and 300 GHz. The frequency of the microwaves 1 used in the invention is comprised between 900 MHz and 1000 MHz, so as to partially solve the problems of the prior art: the microwave frequency chosen is among the lowest frequencies of the microwave-frequency range so as to heat a solid part 4 made of ceramic material with the largest possible penetration depth, and so as to obtain the largest possible volume able to heat a part uniformly in a microwave cavity. In particular, a single-mode resonant cavity, as schematically illustrated in FIG. 1, contains a volume of 9 L able to uniformly heat a sample when the frequency of the microwaves 1 is 915 MHz. The microwaves 1 are for example emitted into the cavity in a direction normal to the plane of the cross section illustrated in FIG. 1. In comparison, a similar cavity, but modified (for example geometrically) to be single-mode resonant for microwaves 1 of a frequency equal to 2.45 GHz would contain a similar volume of 25 times smaller size. In the various embodiments of the invention, the size of the solid part 4 made of ceramic material is chosen to be smaller than the size of the cavity. Advantageously, it is possible to choose the size of the solid part 4 depending, inter alia, on the frequency of the emitted microwaves 1: D being the maximum size of a part 4, it is possible to choose the size D so that the ratio between the penetration depth of the microwaves into the material of the part 4 and D is comprised between 0.5 and 100, and preferably between 0.5 and 10. In the various embodiments of the invention, the microwaves 1 may be emitted into a cavity 9 with a magnetron.

Generally, in all of the embodiments of the invention, the method is carried out in a cavity 9 formed by a chamber the geometry of which is suitable for propagating and supporting single-mode (monomode) resonance of an electromagnetic field at a frequency $v_0$ comprised between 900 MHz and 1 GHz, and advantageously substantially equal to 915 MHz. In the various embodiments of the invention, the configuration employed is preferably one in which the cavity 9 is designed to support one mode of resonance of the microwaves 1—the cavity 9 is thus said to be single-mode. The geometry of the cavity 9 may be adjusted before the introduction of a sample so as to be single-mode. The cavity illustrated in FIG. 1 is schematic: in practice, it is possible to modify the cavity by varying, for example, the parameters of a movable short-circuit piston or of an iris in the waveguides that are used to introduce the microwaves 1 into the cavity. In all of the embodiments of the invention, the electric field E in the cavity when it is empty, when the microwaves 1 are emitted into it, has a uniform direction. In particular, the direction of the field E is uniform in the volume in which a solid part 4 made of ceramic material is placed during a heat-treatment process and advantageously a densification process. A vector E is illustrated in FIG. 1.

At least one solid part 4 made of ceramic material is placed in a cavity 9. It is advantageously placed on a holder made of a thermal insulator 7. By "solid part made of ceramic material" what is meant is a part comprising at least one ceramic material and that is able to support itself mechanically, for example when placed on a holder, in contrast to a powder of ceramic material placed in a crucible. A solid part 4 made of ceramic material may be porous. By "porous" what is meant is that a solid part 4 contains pores, i.e. volumes able to contain a liquid or gaseous medium. In particular, a porous material is a material having a ratio between the volume of pores and the apparent volume of the material substantially different from zero, and preferably higher than 1%. The solid part 4 is able to support itself, when placed on a holder, by virtue for example of bonds between the various grains of the material, ensuring the mechanical stability of the part. Generally, the ceramic material of a solid part 4 made of ceramic material is suitable for absorbing microwaves 1 at the frequency $v_0$ and at a temperature T higher than or equal to 700° C. In particular embodiments of the invention, the material of a solid part 4 may be a ceramic oxide, for example chosen from alumina, zirconia and spinel. The mode of propagation of the microwaves 1 through the cavity 9 may be chosen so as to optimize the absorption of the microwaves 1 by the material of the part 4. During the emission of the microwaves 1, at least one stationary local electric-field and/or magnetic-field extremum may be formed in separate locations in a single-mode cavity 9. For example anti-nodes and nodes of the electric and/or magnetic field may be arranged longitudinally in a cavity 9 in phase quadrature. Preferably, a solid part 4 made of ceramic material is arranged at an antinode of the electric or magnetic field in the cavity 9.

In one particular embodiment of the invention, the thermal insulator 7 may for example be the thermal insulator 7 liteCell (AET Technologies, thermal insulator with a high alumina content).

The solid part 4 made of ceramic material is surrounded by at least one first susceptor 3. In one particular embodiment of the invention, which is illustrated in FIG. 1, a solid part 4 made of ceramic material is surrounded by two first susceptors 3, to the left and to the right of the solid part 4 made of ceramic material, respectively. In other embodiments of the invention, one or more first susceptors 3 may surround a solid part 4 made of ceramic material. Advantageously, at least one element chosen from a ridge and an apex of at least one said first susceptor is rounded. This characteristic limits or prevents the appearance of plasma during the heat treatment. By "rounded" what is meant is that the various walls of a first susceptor 3 join to form ridges and/or apexes the surface of which follows at least one radius of curvature the length of which is larger than one-thousandth of the maximum dimension of the cavity 9 and preferably than one-hundredth of the maximum dimension of the cavity 9.

The dimensions, the material and the arrangement of the one or more first susceptors 3 are chosen, or configured, so that infrared radiation is emitted directly toward a said solid part 4 during an interaction with the microwaves (1) at the frequency $v_0$ in the vicinity of each said solid part 4 or around each said part 4. By "directly", what is meant is that the path of the infrared radiation emitted by one or more first susceptors 3 toward the one or more solid parts 4 does not pass through any other part made of solid material and passes only through the gas phase surrounding the one or more solid parts 4.

By "in the vicinity" what is meant is a length smaller than the characteristic length of one or more than one solid part 4 made of ceramic material.

A susceptor is a material capable of an excellent absorption of the radiation of the microwaves 1 at a given frequency. During the absorption of this radiation, the susceptor material may re-emit the absorbed energy via infrared radiation 2 for example. The absorption of a susceptor material is governed by high dielectric, electric or magnetic losses during the excitation of the material by an electromagnetic field, as for example in the case of the microwaves 1. The materials used as first and/or second susceptors in the embodiments of the invention may advantageously be silicon carbide (SiC) and/or lanthanum chromite ($LaCrO_3$). Other materials with high capacities to absorb microwaves 1 may be used. Materials including a refractory and semiconductor oxide of a transition metal may be used. It is also possible to use materials composed of carbides, such as boron carbide for example.

Generally, and in all of the embodiments of the invention, the first susceptors 3 comprise at least one first main surface 5. By "main surface" what is meant is that the arrangement of a portion or of the entirety of a first susceptor 3 or of a second susceptor 12 may be defined by a surface. A main surface may be a plane: FIG. 1 for example illustrates two first susceptors 3 the first main surfaces 5 of which are planes, said susceptors being seen in cross section. One of these main surfaces is illustrated by the dashed white line. A main surface may also be curved, for example in the case of the lateral surface of a cylinder. Generally, and in all of the embodiments of the invention, each said first or second main surface 5, 21 of each said first or second susceptor 3, 12 is a ruled surface, the generatrices of which are parallel to the electric field E of the cavity 9 when it is empty, and/or of the volume suitable for receiving the sample. This feature allows one technical problem of the prior art to be solved, namely that of how to treat a solid part 4 made of ceramic material at high temperature, for example at a temperature above 700° C., with microwaves 1 of frequency $v_0$ comprised between 900 MHz and 1 GHz, without forming a plasma or any electric arcs in the cavity 9. Physical aspects of the solution to this technical problem are detailed in the description of FIGS. 6 and 7.

Local absorption of the microwaves 1 allows, depending on the arrangement of the various susceptors in the cavity 9, a volume to be formed in which the solid part 4 may be heated directly by the one or more first susceptors 3, by infrared radiation.

Advantageously, the assembly formed by a solid part 4 made of ceramic material and the one or more first susceptors 3 surrounding a solid part 4 made of ceramic material is arranged (or placed) in a first thermal confinement 10 made of thermal insulator 7. In one particular embodiment of the invention, the thermal insulator 7 may be made of liteCell (AET Technologies S.A.S., thermal insulator with a high alumina content) and/or Quartzel (registered trademark, Saint-Gobain Quartz S.A.S.). This confinement by a thermal insulator 7 allows energy losses via radiation during the heat treatment to be limited. The shape of the thermal confinement 10 may be cylindrical.

In one embodiment of the invention illustrated in FIG. 1, two second susceptors 12 surround a first thermal confinement 10. The assembly composed of the second susceptors 12 and of the first thermal confinement 10 is surrounded by a second thermal confinement 11 made of thermal insulator 7. This structure allows the thermal confinement to be increased. In this particular embodiment of the invention, the second thermal confinement 11 is made of a thermal insulator 7.

In the embodiment of the invention illustrated in FIG. 1, the second thermal confinement 11 is placed on a deck 8 made of aluminum.

The cavity 9, the first thermal confinement 10 and the second thermal confinement 11 may be drilled in order to allow a pyrometric line of sight 6 to be drawn. This line of sight 6 may allow a remote temperature sensor to measure the temperature of a solid part 4 made of ceramic material during a heat treatment. In one particular embodiment of the invention, the temperature sensor and the emitter of the microwaves 1 are connected by way of a bus to a processing unit. The processing unit comprises one or more microprocessors and a memory. The processing unit makes it possible to independently control the emission power of the microwave emitter and to process the information delivered by the temperature sensor. In particular embodiments of the invention, the power is automatically controlled depending on a given temperature set point. The temperature set point may be variable over time so as to allow defined treatment temperature profiles, such as temperature ramps or constant-temperature heat treatments, to be performed. According to one embodiment of the invention, it is possible to measure, throughout or during some of the emission of the microwaves 1, the temperature of a solid part 4 made of ceramic material, and then to adjust or automatically control the emission power of the microwaves depending on the measured temperature.

Figure 2:
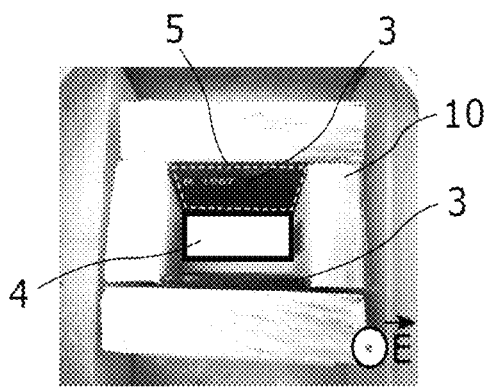
FIG. 2 is a photograph of one portion of a device used for implementing the invention.

FIG. 2 is a photograph of one portion of a device used to implement a method of the invention. A solid part 4 made of ceramic material is schematically illustrated therein by a white rectangle, for the sake of clarity of the photograph. Two first susceptors 3 surround the solid part 4 made of ceramic material. By "surround" what is meant here is that at least half of the area of a solid part 4 made of ceramic material is located in the vicinity of a first susceptor 3. The first main surface 5 of one of the first susceptors 3 is shown by a dashed white rectangle in perspective. The field E is illustrated at the bottom right of the photograph. In this embodiment of the invention, the planar first main surfaces 5 of the two susceptors are parallel to the direction of the field E. The first susceptors 3 and the solid part 4 made of ceramic material are placed in the interior of a first thermal confinement 10, partially formed by the four bricks illustrated in the photograph.

Figure 3:
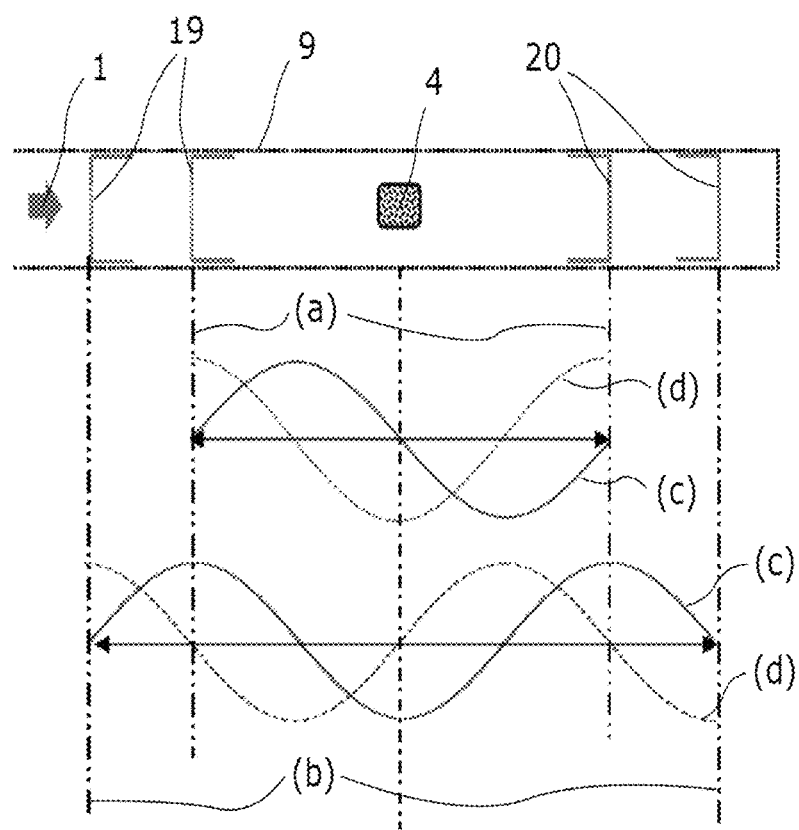
FIG. 3 is a schematic representation of a side view of the cavity, containing a part, and of the electric and magnetic fields associated with various configurations of the cavity.

FIG. 3 is a schematic representation of a side view of the cavity 9 containing a part 4, and of the electric and magnetic fields associated with various configurations of the cavity 9. A cavity 9 may be formed from walls, from a coupling iris 19 at one of its ends and from a short-circuit piston 20 at the other of its ends. A first configuration (a) is associated with a position of a coupling iris 19 and a position of a short-circuit piston 20, which positions are indicated by irregular dot-dashed lines. A second configuration (b) is associated with another position of a coupling iris 19 and another position of a short-circuit piston 20, which positions are also indicated by irregular dot-dashed lines. In the middle of FIG. 3, the amplitude of the electric field (c) and the amplitude of the magnetic field (d) corresponding to configuration (a) of the cavity are schematically illustrated. At the bottom of FIG. 3, the amplitude of the electric field (c) and the amplitude of the magnetic field (d) corresponding to configuration (b) of the cavity are schematically illustrated.

In the embodiments of the invention, the part 4 is placed at a local extremum of the electric or magnetic field. In configuration (a) of the cavity, the part 4 is placed at an anti-node (or extremum) of the amplitude of the magnetic field (d) and at a node of the electric field (c). In configuration (b) of the cavity, the part 4 is placed at an anti-node (or extremum) of the electric field (c) and at a node of the magnetic field (d).

Figure 4:
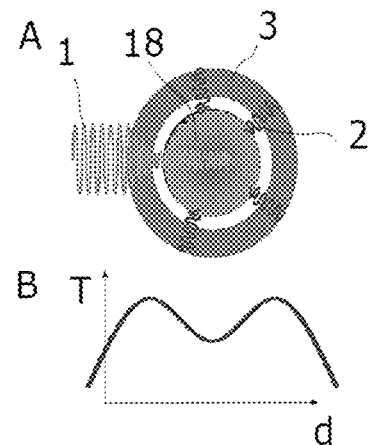
FIG. 4 is a schematic representation of an indirect heating method different from the invention.

FIG. 4 is a schematic representation of an indirect heating method different from the invention. Panel A of FIG. 4 is a schematic representation of a top view of the implementation of an indirect heating operation.

Indirect heating requires at least one first susceptor 3 and a sample 18 surrounded by the one or more first susceptors 3. In the case of indirect heating, the material from which the sample 18 to be heated is made is transparent to the microwaves 1 or opaque to the microwaves 1.

By "transparent" what is meant is a material the dielectric and/or magnetic losses of which are substantially zero when the material is subjected to a microwave field 1 at a given frequency. A transparent material generally possesses a very low electrical conductivity. The electrical conductivity of a transparent material may be lower than $10^{-8}$ S·m$^{-1}$, preferably lower than $10^{-10}$ S·m$^{-1}$ and more preferably lower than $10^{-12}$ S·m$^{-1}$.

By "opaque" what is meant is a material that reflects the radiation of the microwaves 1 for a given frequency. An opaque material in general possesses a high electrical conductivity. The electrical conductivity of an opaque material is preferably higher than $10^3$ S·m$^{-1}$. In this embodiment, which is different from that of the invention, the interaction between the microwaves 1 and the sample 18 does not allow the temperature of the sample 18 to increase. In contrast, the susceptor 3 placed around the sample 18 absorbs the microwaves 1 and emits infrared radiation 2. The sample may then be heated by the infrared radiation 2.

Panel B of FIG. 4 schematically illustrates a temperature profile along an axis passing through the center of the sample 18. The two temperature maxima of this implementation are located at the distance (indicated by the abscissa d) of the location of the first susceptor 3. The temperature at the center of the sample is mainly due to heating by infrared radiation 2 of the periphery of the sample and/or convection of the medium surrounding the sample, coupled with thermal conduction within the sample as explained above.

This mode of heat treatment does not allow one technical problem of the prior art to be solved: a significant portion of the efficiency enabled by heating with the microwaves 1 is lost.

Figure 5:
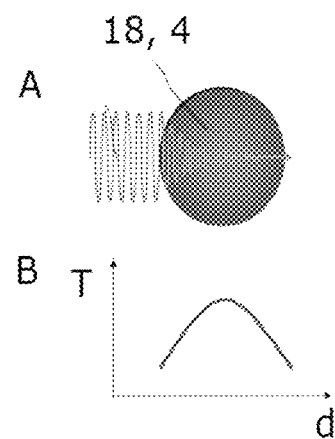
FIG. 5 is a schematic representation of a direct heating method different from the invention.

FIG. 5 is a schematic representation of a direct heating method different from the invention. Panel A of FIG. 5 is a schematic representation of a top view of the implementation of a direct heating operation. In the case of direct heating, the material from which the sample 18 to be heated is made absorbs the microwaves 1 at a given frequency. The interaction between the microwaves 1 and the absorbent material of the sample 18 allows the sample to be heated.

Panel B of FIG. 5 schematically illustrates a temperature profile along an axis passing through the center of the sample 18. In this implementation, which is different from the invention, the temperature profile has a maximum at the center of the sample. The profile may be different because it in particular depends on the size of the sample 18, on the material of the sample 18, and on the power and wavelength of the emitted microwaves 1.

This implementation does not allow certain technical problems of the prior art to be solved. If the sample 18 is a solid part 4 made of ceramic material, it is possible for the material of the part not to be able to be directly heated by microwaves 1 at room temperature. In addition, a porous part 4 will be densified during a high-temperature heat treatment: in the case of certain ceramic materials, if the density of the part is too high, the penetration volume of the microwaves 1 may be small with respect to the total volume of the part 4. The effectiveness of the heating achieved with the microwaves 1 is thus restricted, and does not allow certain temperature set points, for example temperatures above 700° C., to be reached.

Figure 6:
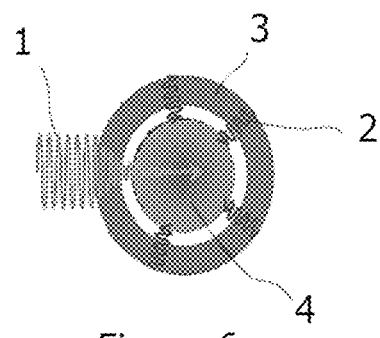
FIG. 6 is a schematic representation of a hybrid heating method according to one embodiment of the invention.

FIG. 6 is a schematic representation of a top view of a hybrid heating process according to one embodiment of the invention. The implementation of this embodiment of the invention includes a solid part 4 made of ceramic material. The sample is surrounded by a first susceptor 3. In this embodiment of the invention, the susceptor 3 absorbs, at a given frequency, the microwaves 1. The first susceptor 3 emits, in this case, infrared radiation 2 that contributes to the heat treatment of the solid part 4 made of ceramic material, in particular during a first phase of increase of the temperature of the solid part 4, in which phase the material of the solid part 4 is able to interact only weakly with the microwaves 1. Furthermore, some of the microwaves 1 may be absorbed, at a given frequency, by the solid part 4 made of ceramic material. This hybrid process allows the solid part 4 to be heated via a contribution made by the infrared radiation and via a contribution made by the microwave radiation 1: the local strength of the electromagnetic field may be moderate in comparison to when an equivalent part 4 is heated in the absence of a first susceptor 3, so as to limit the formation of a plasma 14 in the vicinity of the solid part 4 made of ceramic material while initiating an increase in the temperature of the solid part 4.

Figure 7:
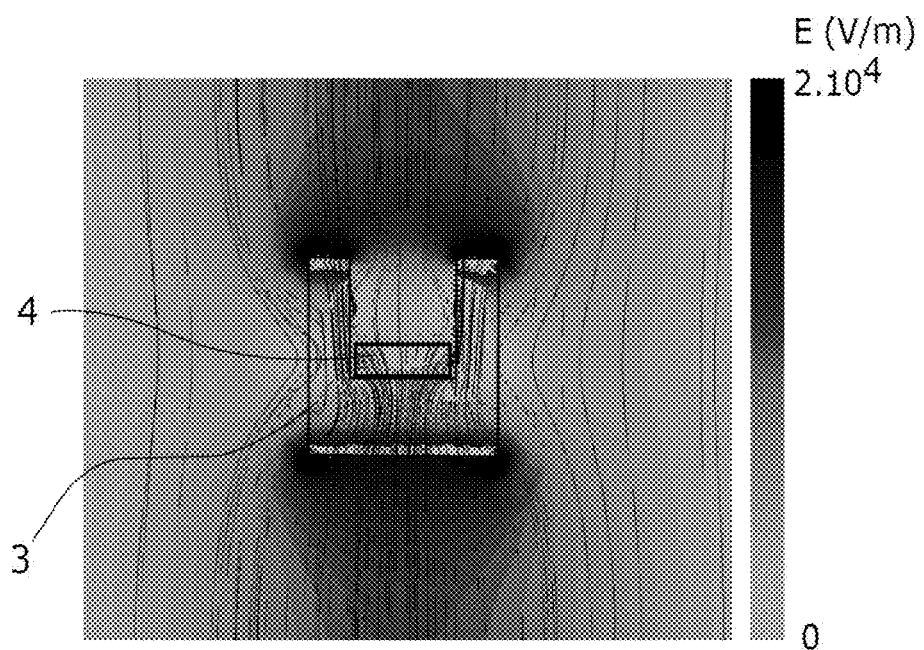
FIG. 7 is an illustration of a simulation of the strength of the electric field about a susceptor different from a susceptor employed in the invention.

FIG. 7 is an illustration of a simulation of the strength of the electric field around a susceptor different from a susceptor employed in the invention. The strength of the electric field is illustrated by the greyscale of the illustration, the maximum strength of E corresponding to the color black. In this embodiment, a first susceptor is a crucible, used for example to sinter a ceramic material initially in powder form. This first susceptor may also contain a solid part 4 made of ceramic material as illustrated in FIG. 7. The lines of the electric field E are illustrated by thin black lines. In the absence of first susceptor and solid part 4 made of ceramic material, the field lines are vertical. The geometry of the illustrated crucible-shaped susceptor does not only comprise first main surfaces 5 the generatrices of which are parallel to the electric field E of an empty cavity 9. The inventors have discovered that the one or more first main surfaces 5 not parallel to the electric field E of an empty cavity 9 are particularly likely to lead to spatial zones in which the electric field is of high-strength, and to discontinuities in the electric field at the surface of a first and/or second susceptor, during the emission of microwaves 1. These zones are particularly likely to lead to the appearance of a plasma and/or electric arcs during the heat treatment and/or densification of a solid part 4 made of ceramic material. The inventors have discovered that it is possible to decrease the size of these zones by employing only one or more first susceptors 3 the first main surfaces 5 of which are parallel to the direction of E in an empty cavity, i.e. susceptors each said first main surface 5 of which is a ruled surface the generatrices of which are parallel to E in an empty cavity 9. It is also possible to decrease the size of these zones by placing, in the cavity, one or more second susceptors 12 each said second main surface 21 of which is a ruled surface the generatrices of which are parallel to E in an empty cavity 9.

Figure 8:
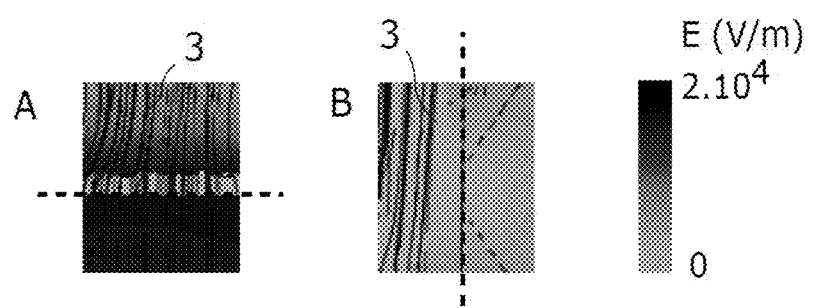
FIG. 8 is a set of illustrations of simulations of the strength of the electric field about a susceptor different from a susceptor employed in the invention.

FIG. 8 is a set of illustrations of simulation of the strength of the electric field about a susceptor different from a susceptor employed in the invention. The strength of the electric field is illustrated by the greyscale of the illustration, the maximum strength of E corresponding to the color black.

In particular, panel A of FIG. 8 is a detail of FIG. 7, corresponding to the bottom portion of the crucible, the geometry of which comprises no first main surface 5 parallel to E in an empty cavity. The dashed line corresponds to the exterior surface of the susceptor, which is arranged above the dashed line. The strength, the variation in the strength and the discontinuity in the electric field illustrated in panel A may favor the appearance of a plasma and/or electric arc during the emission of microwaves 1.

Panel B of FIG. 8 is a detail of FIG. 7, corresponding to a portion on the right of the crucible illustrated in FIG. 7. This portion comprises a first main surface parallel to the field E in an empty cavity. The average strength of E is lower than the average strength illustrated in panel A. The arrangement of this portion allows a temperature increase to be obtained that is sufficient for an effective heat treatment and/or an effective densification without forming a plasma and/or an electric arc in the cavity 9.

Figure 9:
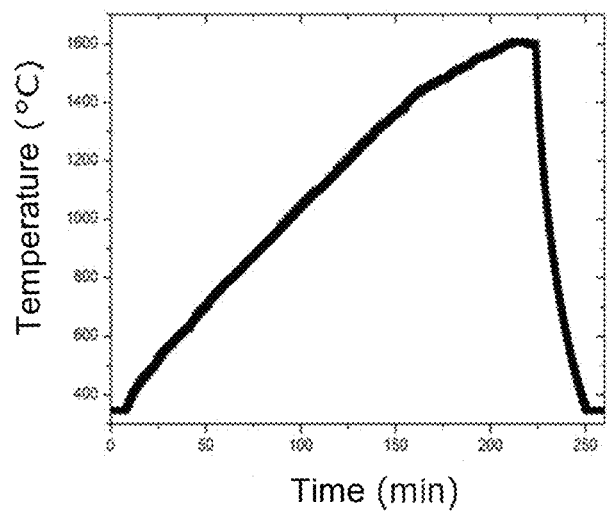
FIG. 9 illustrates the variation in the temperature of a part made of ceramic material during a heat treatment according to one embodiment of the invention.

FIG. 9 illustrates the variation in the temperature of a solid part 4 made of ceramic material during a heat treatment according to one embodiment of the invention. The ceramic material used may be alumina. In the embodiment of the invention the variation of which is illustrated, the temperature set point is 1600° C. This set point is achieved in less than 250 min. Three phases of the variation may be seen: a first phase (between 0 min and about 40 min) in which the slope of the variation is on average 9° C./min, a second phase (about between 40 min and 150 min) in which the slope of the variation is on average 6.5° C./min and a third phase (about between 150 min and 210 min) in which the slope of the variation is on average 3.5° C. This variation has an influence on the microstructure of the ceramic material of a part 4.

Figure 10:
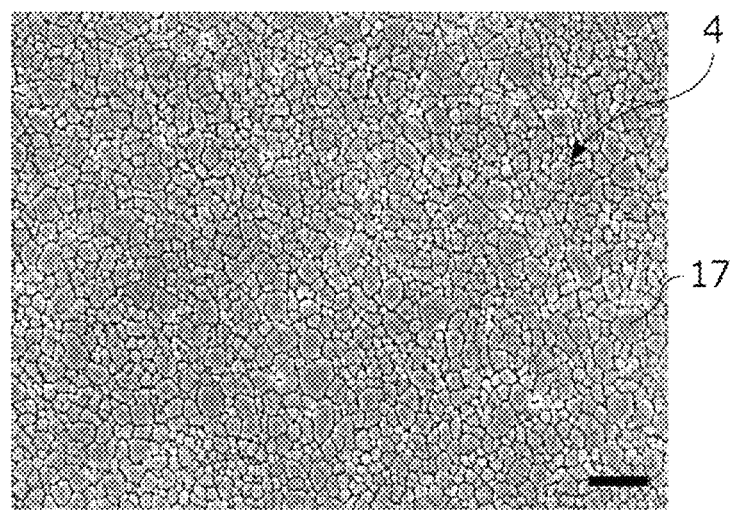
FIG. 10 is a micrograph taken by scanning electron microscopy of a cross section of a part made of ceramic material after a heat treatment according to one embodiment of the invention.

FIG. 10 is a micrograph taken by scanning electron microscopy of a cross section of a solid part 4 made of ceramic material after a heat treatment according to one embodiment of the invention. The ceramic material used may be alumina. The scale bar corresponds to a length of 1 μm. The microstructure of the ceramic material of the micrograph corresponds to that obtained with the heat treatment the variation of which is illustrated in FIG. 9. Initially, before the heat treatment, the employed solid part 4 made of ceramic material is a pellet of the oxide alumina, the diameter of which is for example 80 mm. After a densification process according to one embodiment of the invention, the measured density of the solid part 4 made of ceramic material is strictly higher than 95% (by volume) and the microstructures observed in the material are fine: in particular, FIG. 10 illustrates a microstructure the grains 17 of which have an average diameter smaller than one micron and substantially equal to 350 nm. When the susceptors comprise first main surfaces 5 and/or second main surfaces 21 that are not parallel to the field E of an empty cavity 9, the appearance of a plasma may prevent this setpoint temperature from being reached. In embodiments of the invention, the heat-treatment time corresponding to a step of emitting the microwaves 1, and the power of the emitted microwaves 1, may be parameterized so as to heat treat and/or densify a solid part 4 made of ceramic material to a value higher than 90% ceramic material per unit volume.

In embodiments of the invention, the ceramic material of a part 4 may be polyphase, and comprise a plurality of different ceramic phases. The properties of interaction of these materials with the microwaves 1 may be different during an emission of microwaves 1 of frequency $v_0$ comprised between 900 MHz and 1 GHz. The arrangement of the various first susceptors 3 may allow the power dissipated in the various phases to be varied and thus certain, or at least one, of the phases of one material of a part 4 to be selectively heat-treated and/or densified.

Advantageously, two parts 4 made of optionally porous ceramics may be heat treated so as to be brazed during the microwave emission. A process according to the invention allows, in this case, conventional temperatures for brazing ceramic parts to be reached while decreasing the risk of appearance of a plasma, while saving energy with respect to conventional brazing methods and while decreasing the time required to reach these conventional brazing temperatures (which may be comprised, depending on the ceramic material of a solid part 4, for example between 600° C. and 1200° C.).

The invention claimed is:

1. A process for heat treating two solid parts made of ceramic material in a microwave cavity, the microwave cavity being formed by a chamber having a geometry which is suitable for resonance in a single mode of an electromagnetic field defining at least one local extremum of an electric field E or a magnetic field in the microwave cavity, at a frequency vo comprised between 900 MHz and 1 GHz, the direction of the electric field E being substantially uniform in the microwave cavity when it is empty, the process comprising at least the steps of:
   a) placing, in the microwave cavity, two solid parts made of ceramic material suitable for absorbing microwaves at the frequency vo and at a temperature T higher than or equal to 700° C., at the at least one local extremum of the electric field E or the magnetic field, the two solid parts being surrounded by at least one first susceptor having first dimensions, wherein the first dimensions, a material of the at least one first susceptor, and an arrangement of the at least one first susceptor are configured so that infrared radiation is emitted directly toward a at least one of the two solid parts during an interaction with the microwaves, the at least one first susceptor comprising at least one first main surface, the at least one first main surface being a ruled surface having generatrices which are parallel to the electric field E in the microwave cavity when it is empty.
   b) emitting the microwaves at the frequency vo into the microwave cavity and brazing the two solid parts.

2. The process as claimed in claim 1, wherein the two solid parts are initially porous and wherein the two solid parts are densified by heating in step b).

3. The process as claimed in claim 1, wherein at least one element chosen from a ridge and an apex of the at least one first susceptor is rounded.

4. The process as claimed in claim 1, wherein the at least one first susceptor is made of silicon carbide.

5. The process as claimed in claim 1, wherein the ceramic material comprises at least one of alumina and zirconia.

6. The process as claimed in claim 1, wherein the two solid parts are densified so as to comprise at least 90% ceramic material per unit volume.

7. The process as claimed in claim 1, further comprising a step of placing the at least one first susceptor and the two solid parts in a first thermal confinement.

8. The process as claimed in claim 7, wherein the first thermal confinement is surrounded by at least one second susceptor having second dimensions.

9. The process as claimed in claim 8, wherein surrounding the first thermal confinement by the at least one second susceptor forms a second volume bounded by said one or more the at least one second susceptor, wherein the second dimensions, a material of the at least one second susceptor, and an arrangement of the at least one second susceptor are configured so that infrared radiation is emitted during an interaction with the microwaves.

10. The process as claimed in claims 8, wherein the at least one second susceptor and the first thermal confinement are arranged in a second thermal confinement.

11. The process as claimed in claim 8, wherein the at least one second susceptor comprises at least one second main surface, the at least one second main surface being a ruled surface having generatrices which are parallel to the electric field E in the microwave cavity when it is empty.

12. The process as claimed in claim 8, wherein at least one element chosen from a ridge and an apex of the at least one second susceptor is rounded.

13. The process as claimed in claim 1, wherein the material of the at least one first susceptor comprises at least one of a refractory and semiconductor oxide of a transition metal, and a carbide.

14. The process as claimed in claim 1, wherein the material of the at least one first susceptor comprises at least one of silicon carbide and lanthanum chromite.

15. The process as claimed in claim 1, wherein the ceramic material comprises a plurality of different ceramic phases and wherein the first dimensions, the material of the at least one first susceptor, and the arrangement of the at least one first susceptor are configured to selectively heat treat at least one of the plurality of different ceramic phases of each of the two solids parts.

16. The process as claimed in claim 1, wherein a maximum size D of the two solid parts is chosen so that a ratio between a penetration depth of the microwaves into the two solid parts and D is between 0.5 and 10.

* * * * *

UNITED STATES PATENT AND TRADEMARK OFFICE
CERTIFICATE OF CORRECTION

PATENT NO. : 11,713,280 B2
APPLICATION NO. : 16/345664
DATED : August 1, 2023
INVENTOR(S) : Sylvain Marinel et al.

It is certified that error appears in the above-identified patent and that said Letters Patent is hereby corrected as shown below:

In the Claims

In Claim 1, Column 12, Line 4, "frequency vo comprised" should be --frequency $v_0$ comprised--.

In Claim 1, Column 12, Line 10, "at the frequency vo" should be --at the frequency $v_0$--.

In Claim 1, Column 12, Line 18, "toward a at least" should be --toward at least--.

In Claim 1, Column 12, Line 24, "at the frequency vo" should be --at the frequency $v_0$--.

In Claim 9, Column 12, Line 47, "bounded by said one or more the at least" should be --bounded by the at least--.

Signed and Sealed this
Twenty-sixth Day of September, 2023

Katherine Kelly Vidal
*Director of the United States Patent and Trademark Office*